(12) United States Patent
Fouillade et al.

(10) Patent No.: US 9,259,842 B2
(45) Date of Patent: Feb. 16, 2016

(54) INTERACTIVE ROBOT INITIALIZATION

(75) Inventors: Jean Sebastien Fouillade, Redmond, WA (US); Russell Sanchez, Seattle, WA (US); Efstathios Papaefstathiou, Redmond, WA (US); Malek M. Chalabi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 549 days.

(21) Appl. No.: 13/157,327

(22) Filed: Jun. 10, 2011

(65) Prior Publication Data

US 2012/0316676 A1   Dec. 13, 2012

(51) Int. Cl.
| B25J 11/00 | (2006.01) |
| B25J 13/00 | (2006.01) |
| B25J 19/02 | (2006.01) |
| G06N 3/00 | (2006.01) |
| H04L 29/06 | (2006.01) |

(52) U.S. Cl.
CPC ............ *B25J 11/0005* (2013.01); *B25J 13/003* (2013.01); *B25J 19/023* (2013.01); *A47L 2201/00* (2013.01); *G06N 3/008* (2013.01); *H04L 63/083* (2013.01)

(58) Field of Classification Search
CPC .... B25J 11/0005; B25J 11/003; B25J 11/008; B25J 11/009; B25J 13/003; B25J 19/023; B25J 9/003; G06N 3/008
See application file for complete search history.

(56) References Cited

U.S. PATENT DOCUMENTS

| 6,697,707 | B2 | 2/2004 | Peters, II |
| 7,606,411 | B2 | 10/2009 | Venetsky et al. |
| 7,684,894 | B2 | 3/2010 | Sakai et al. |
| 2005/0137747 | A1* | 6/2005 | Miro et al. .................... 700/245 |
| 2005/0237189 | A1* | 10/2005 | Tani ............................... 340/541 |
| 2007/0110286 | A1* | 5/2007 | Sato et al. ...................... 382/118 |
| 2007/0198128 | A1* | 8/2007 | Ziegler et al. ................. 700/245 |
| 2009/0030552 | A1* | 1/2009 | Nakadai et al. ............... 700/258 |
| 2012/0075501 | A1* | 3/2012 | Oyagi et al. ............. 348/231.99 |

OTHER PUBLICATIONS

Yamaguchi, et al., "Robot vision to recognize both face and object for human-robot ball playing", Retrieved at << http://ieeexplore.ieee.org/stamp/stamp.jsp?tp=&arnumber=1225478 >>, Proceedings of the 2003 IEEE/ASME International Conference on Advanced Intelligent Mechatronics, vol. 2, Jul. 20-24, 2003, pp. 999-1004.

Perzanowski, et al., "Building a multimodal human-robot interface", Retrieved at << http://ieeexplore.ieee.org/stamp/stamp.jsp?tp=&arnumber=1183338 >>, IEEE Intelligent Systems, Jan.-Feb. 2001, pp. 16-21.

Wong, George, "Robot that recognize when it gains the attention of a human", Retrieved at << http://www.ubergizmo.com/2011/03/robots-recognize-attention-human/ >>, Mar. 10, 2011, pp. 1-5.

Racoma, J. Angelo, "Self-Charging Robots That Sense Wall Outlets", Retrieved at << http://www.forevergeek.com/2010/01/self-charging_robots_that_sense_wall_outlets/ >>, Jan. 10, 2010, pp. 1-6.

* cited by examiner

*Primary Examiner* — Khoi Tran
*Assistant Examiner* — Adam Mott
(74) *Attorney, Agent, or Firm* — Sandy Swain; Micky Minhas (57) ABSTRACT

Initial interaction between a mobile robot and at least one user is described herein. The mobile robot captures several images of its surroundings, and identifies existence of a user in at least one of the several images. The robot then orients itself to face the user, and outputs an instruction to the user with regard to the orientation of the user with respect to the mobile robot. The mobile robot captures images of the face of the user responsive to detecting that the user has followed the instruction. Information captured by the robot is uploaded to a cloud-storage system, where information is included in a profile of the user and is shareable with others.

20 Claims, 7 Drawing Sheets

INTERACTIVE ROBOT INITIALIZATION

BACKGROUND

A "robot", as the term will be used herein, is an electromechanical machine that includes computer hardware and software that causes the robot to perform functions independently and without assistance from a user. An exemplary robot is a droid that can be configured to fly into particular locations without being manned by a pilot. Sensors on the droid can output data that can cause such droid to adjust its flight pattern to ensure that the droid reaches an intended location.

While the droid is generally utilized in military applications, other consumer-level robots have relatively recently been introduced to the market. For example, a vacuum cleaner has been configured with sensors that allow such vacuum cleaner to operate independently and vacuum a particular area, and thereafter automatically return to a charging station. In yet another example, robot lawnmowers have been introduced, wherein an owner of such a robot lawnmower defines a boundary, and the robot lawnmower proceeds to cut grass in an automated fashion based upon the defined boundary.

When a purchaser of a consumer-level robot utilizes the robot for the first time, the purchaser of the robot typically reads a set of printed instructions to understand how to cause the robot to perform a desired function. Thereafter, the user operates the robot pursuant to the printed instructions—there is very little interaction between the robot and the purchaser to allow the robot to optimally interact with the purchaser or the environment where the robot will be deployed.

SUMMARY

The following is a brief summary of subject matter that is described in greater detail herein. This summary is not intended to be limiting as to the scope of the claims.

Described herein are various technologies pertaining to initial interaction between a robot and one or more users (e.g., when the robot is meeting people for a first time). For instance, a user may purchase a robot, and may wish to begin interactive with the robot or providing commands to the robot. During an initial meeting with an individual, the robot can interact with the individual in a variety of manners. For instance, the robot can initially perform a scan for available wireless networks. The robot may then present to the user one or more wireless networks that have been found during the scan, and the user can inform the robot of the wireless network that is desirably accessed by the robot. If a password is needed to access the wireless network, the robot can output a request to the user for the password. The user may then interact with the robot in a variety of manners to provide the robot with the password. For instance, the robot may be packaged with a remote control, and the user can provide the network password to the robot through utilization of one or more buttons on the remote control.

In another example, the robot can be configured with voice recognition technologies, such that the user can audibly state the network password (in individual letters/numbers and/or words), and the robot can recognize such password. In still yet another example, the robot can be equipped with one or more cameras and can be configured to perform gesture recognition. Through one or more gestures, the user can inform the robot of the network password. In still yet another example, the robot may have a keypad or a touch sensitive display screen thereon, and the user can provide the robot with the network password by the pressing keys on the keypad or graphical buttons on the touch sensitive display screen.

Once the robot is able to access the wireless network, the robot can cause updates to be downloaded thereto. These updates may include software updates and/or firmware updates. Moreover, once the robot is connected to the wireless network, the user can cause the robot to be linked to an online account of the user. The online account of the user can allow for cloud-based storage of data captured by the robot and may further allow for certain commands to be transmitted to the robot by way of the online account (e.g. if the user is remotely located from the robot). Moreover, the robot can utilize cloud-based services to share data captured by the robot (and communicate) with remote users.

Before or after obtaining access to the wireless network, the robot can execute an introduction protocol that is utilized to introduce the robot to those that will be interacting with the robot in the future. For example, the robot can be equipped with a camera and can be mobile in nature (e.g., at least a portion of the robot is able to rotate). During an initial user experience with the robot, the robot can capture a plurality of images of its surroundings. For instance, a body of the robot can rotate to capture several images of the surroundings of the robot. The robot is further equipped with face recognition technology that analyzes images captured by the robot and searches for a human face. If the face of a user is located in the plurality of images captured by the robot, the robot can orient itself to face such user. In other words, from the perception of the user, the robot will be looking at the user. At this point, the robot can introduce itself to the user by, for instance, exchanging pleasantries with the user; asking a name of the user, informing the user of the name of the robot, or the like.

Moreover, the robot can output at least one instruction to the user with respect to orientation of the user with respect to the robot. In an example, the robot can include one or more cameras and can be configured to undertake facial recognition. To perform facial recognition, however, the robot may desire to capture several images of the user from varying sides. For instance, the robot can output an instruction informing the user to directly face the robot, may thereafter output instruction to the user to turn 90° to the right, and then output an instruction to the user to turn 180°. Therefore, the robot, through utilization of such instructions, can capture images of the user from a multitude of perspectives, allowing the robot to recognize the user in the future from varying perspectives.

Still further, the robot can request a voice sample from the user. This voice sample may include the name of the user, one or more prompted words or phrases, or the like. The robot can later use such a voice sample to recognize the voice of the user. Accordingly, when the user subsequently wishes to interact with the robot, the user can speak and the robot can recognize the user based upon the user speech.

Other aspects will be appreciated upon reading and understanding the attached figures and description.

DETAILED DESCRIPTION

Various technologies pertaining to initial interactions between a user and a robot will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, the terms "component" and "system" may refer to hardware that is configured to perform a particular function, such as a Field Programmable Gate Array (FPGA) or other suitable hardware.

Figure 1:
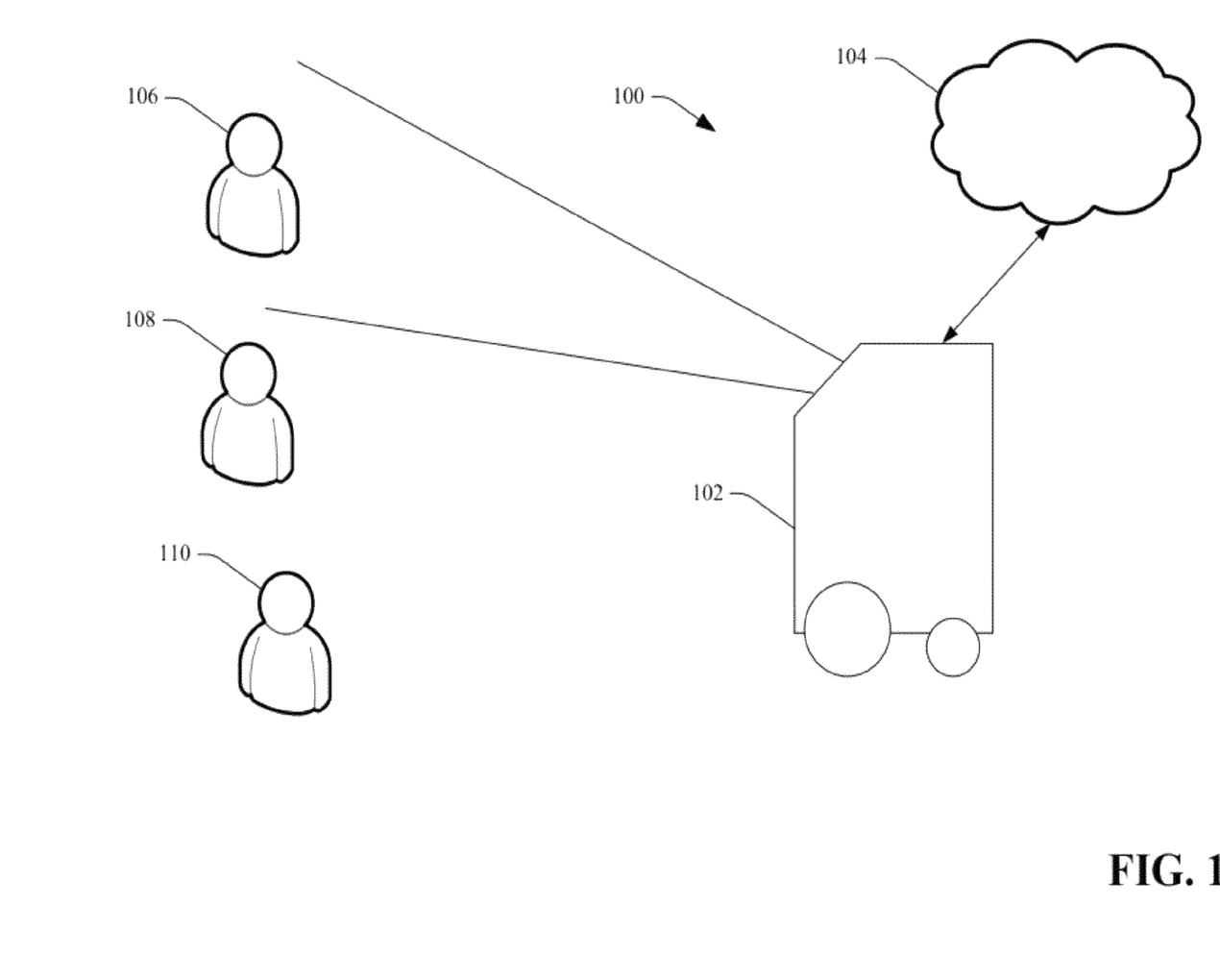
FIG. 1 is a diagram that illustrates interaction between a robot and users thereof.

With reference now to FIG. 1, an exemplary diagram 100 that illustrates an interaction between a robot and one or more users is illustrated. The diagram 100 illustrates a robot 102 that is mobile in nature. For example, as will be described below, the robot 102 can include a drive motor that causes one or more wheels on the robot 102 to turn such that the robot 102 can navigate around in its surroundings. Alternatively, the robot 102 may include extensions (legs) that allow the robot 102 to move about in its surroundings.

The robot 102 can be connected to a wireless local area network (LAN) such that the robot 102 has access to certain cloud computing services, which are represented as being included in a cloud. An exemplary cloud computing service is the provision of software and/or firmware updates to the robot 102. Other exemplary cloud-based services include online storage, profile generation/maintenance, telepresence applications, and the like.

FIG. 1 is presented herein to facilitate describing an initial interaction between the robot 102 and one or more users 106, 108, and 110 that are in the presence of the robot 102. Accordingly, in a first example, interaction between the robot 102 and the one or more users 106-110 can be undertaken upon the first use of the robot 102 (immediately subsequently to the robot being removed from packaging and being charged, immediately subsequently to being connected to a wireless LAN, etc.). In another example, interaction between the robot 102 and users 106-110 can occur upon the robot 102 recognizing that the robot 102 is in a new environment, and therefore may be meeting new users. In yet another example, interaction described herein between the robot 102 in the users 106-110 can occur upon the robot 102 recognizing that the robot 102 has not before interacted with one or more of the users 106-110. In still yet another example, interaction described herein between the robot 102 and the users 106-110 can occur upon one or more of the users 106-110 manually causing the robot 102 to perform operations that are described below. In another example, interaction described herein between the robot 102 and users 106-110 can occur subsequent to a hard drive of the robot 102 being reformatted.

The robot 102 can include a camera (which may be a video camera and/or an infrared camera), and when initially interacting with users (in one of the aforementioned exemplary scenarios) can cause the camera to be rotated about the surroundings of the robot 102 to scan its surroundings for users. In an exemplary embodiment, the robot 102 can perform a 360° scan and capture a plurality of images of the surroundings of the robot 102. Thereafter, the robot 102 can analyze the images to ascertain whether a user is captured in one or more of the images. In another exemplary embodiment, the robot 102 can scan its surroundings by rotating such that the camera captures images as the robot 102 rotates, and can cease rotating when an image captured by the camera of the robot 102 includes a user.

Subsequent to the robot 102 recognizing that at least one of the users 106-110 is in the environment of the robot 102, the robot 102 can optionally be configured to greet the at least one user. During the greeting, for example, at least one of the users can assign a name to the robot (either verbally, through a touch screen, through a keypad, a remote control, or the like). The robot 102 can introduce itself to the user (e.g., indicate a name of the robot 102, whether pre-assigned or assigned buy a user, ask the name of the located user, exchange pleasantries, or the like). In other words, once the robot 102 recognizes that the user 106 is in the surroundings of the robot 102 (in the same room), the robot 102 can turn and face the user 106 such that from the perception of the user 106 the robot 102 is looking at the user 106. Additionally, the robot 102 can communicate with the user 106 such that the user 106 will ascertain that the robot 102 is communicating with him or her. For instance, the robot 102 can include a display screen and can display a graphic to the user 106 such that the user 106 is aware that the robot 102 is communicating with the user 106. Additionally, the robot 102 may include a speaker such that the robot 102 can output audio signals to inform the user 106 that the robot 102 is communicating with the user 106. Again, this communication may be in the form of initial pleasantries that are generally exchanged between human beings.

The robot 102 can comprise one or more applications that are configured to perform face recognition as well as voice recognition. To perform face recognition for the user 106, however, the robot 102 must have access to images of the face of the user 106. Accordingly, subsequent to determining that the user 106 is in the surroundings of the robot 102, the robot 102 can output an instruction to the user 106 that instructs user 106 as to an orientation with respect to the robot 102. For instance, the robot 102 can output an instruction on a graphical user interface of the robot 102 that instructs the user 106 to look directly at the robot 102. In another example, the robot 102 can output audible instructions to the user 106 that instructs the user 106 to look directly at the robot 102. Furthermore, the robot 102 may include a video camera that captures images of the user 106 and can analyze images in the video to ascertain when the user 106 responds to the instruction output by the robot 102. Subsequent to the robot 102 ascertaining that the user 106 has followed the instruction(s) output by the robot 102, the robot 102 can cause the video camera or other camera to capture an image of the face of the user 106.

Thereafter, the robot 102 can output another instruction pertaining to the orientation of the user 106 with respect to the robot 102. Again, the robot 102 can monitor the user 106 until the robot 102 determines that the user 106 has followed the instruction(s) output by the robot 102. Pursuant to an example, the robot 102 can output an instruction (e.g. graphically or through audio signals) instructing the user 106 to turn 90° to the left. Accordingly, the robot 102 can capture a side profile image of the user 106 responsive to the robot 102 ascertaining that the user 106 has followed the instructions from the robot 102 (to turn to the left). Capturing images of the user 106 from varying perspectives can allow for the robot 102 to recognize the user 106 from a plurality of different perspectives.

In another exemplary embodiment, rather than outputting instructions to the user 106, the robot 102 can passively monitor the user 106 over time to ascertain situations where an image of the face of the user 106 can be employed in connection with facial recognition. For instance, the robot 102 can recognize that the user 106 is looking directly at the robot 102, and the robot 102 can capture an image of the user 106. Later, the robot 102 can determine that the face of the user 106 has turned to the right relative to the robot 102, and the robot 102 can capture an image of the user 106. These users, which are captured by passively monitoring the user 106, can be used in connection with facial recognition during subsequent interactions of the user 106 with the robot 102.

Additionally, as mentioned above, the robot 102 can be configured with functionality that allows for the robot 102 to recognize the voice of the user 106. Thus, during an initial meeting between the robot 102 and the user 106, the robot 102 can request a voice sample from the user 106. For instance, the robot 102 can provide the user 106 with a prompt to say a particular word or phrase. The robot 102 can capture the response of the user 106 by way of a microphone and can store such response in connection with performing voice recognition during subsequent meetings between the robot 102 and user 106. Therefore, the robot 102 can recognize the user 106 without performing facial recognition. Alternatively, the robot 102 can passively monitor actions of the user 106 and capture a voice sample when the user 106 is speaking, either to the robot 102 or another person.

Furthermore, the robot 102 can prompt the user 106 for a selection of an avatar that can be utilized by the robot 102 when interacting with the user 106. Pursuant to an example, the robot 102 may include a display screen that displays a graphical user interface, and can present a plurality of animated avatars to the user 106 for selection. The user 106 may select one of such avatars through voice commands, gesture, a remote control, keypad, or the like. When the robot 102 subsequently recognizes the user 106 (through face or voice recognition) or is otherwise interacting with the user 106, the robot 102 can display the avatar selected by the user 106 on the display screen of the robot 102. Pursuant to an example, an image of the user 106 captured by the robot 102 subsequent to the robot 102 instructing the user 106 to face the robot 102 can be automatically utilized as the avatar for the user 106. Moreover, such avatar can be displayed by the robot 102 when the user 106 is controlling the robot 102 from a remote location. That is, the robot 102 can support telepresence applications such that the robot 102 can act as a proxy for the user 106 when the user 106 is located remotely from the robot 102. When the robot 102 acts as a proxy for the user 106, the robot 102 can display the avatar for the user 106 to inform others that the robot 102 is acting as a proxy for the user 106.

The robot 102 can capture additional information pertaining to the user 106, such as interests of the user 106, habits of the user, and other information that can be utilized to provide the user 106 with services or data. For example, the robot 102 can ask the user 106 a series of questions to generate a profile of the user 106. Exemplary questions that can be set forth by the robot 102 include "What is your favorite type of movie?", "Who is your favorite musical artist?", "Do you like to cook?", "Do like to watch sports?", or any other suitable questions. Based upon answers of the user 106 to such questions, the robot 102 can build a profile that can indicate interests of the user 106, which can be used by the robot 102 to provide services to the user 106 (such as presentation of movie previews, song previews, recipes or the like).

As mentioned above, the robot 102 may be in communication with the cloud 104 by way of a wireless LAN, and the robot 102 can be configured to upload one or more images of the user 106 and or data that can be used to profile the user 106 to the cloud 104. For instance, the user 106 (and/or an owner of the robot 102 if other than the user 106) may have an online account in the cloud 104. The images of the user 106 and profile data pertaining to the user 106 can be uploaded to the cloud 104 by the robot 102, where such data can be accessed by way of the online account of the user 106 and/or the owner of the robot 102. This can allow the owner of the robot 102 to ascertain who the robot 102 interacts with, can allow the owner of the robot 102 to alter profiles online, and perform other suitable tasks.

After the robot 102 has completed the initial interaction with the user 106, the robot 102 can continue scanning its surroundings for other users and/or can review a previous scan to ascertain that other individuals are also in its surroundings. The robot 102 may then re-orient itself to face another user (the second user 108). The robot 102 may then repeat interactions described above with the second user 108.

If the robot 102 is meeting several users at one time, a rank of such users 106-110 can be established by the owner of the robot 102. For instance, during the initial scan of the surroundings of the robot 102, the robot 102 can ask which user is the primary owner of the robot 102. This primary owner of the robot 102 may then take priority over other users with respect to commands issued to the robot 102. Furthermore, the robot 102 can classify users that the robot 102 meets. For example, the user 106 may be a parent while users 108 and 110 may be children. In another example, the robot 102 can classify the users 106-110 as family, and when the robot 102 later meets another user, the robot 102 can classify such user as a friend of the family. This classification of users can later be employed by the robot 102 in connection with interacting with users. For instance, a command received by a family member may take priority over a command received from a family friend.

The information captured by the robot 102 during initialization of the robot 102 (interests of users, images of faces of users, voice samples of users) can be retained by the robot 102 and utilized, for instance, in connection with recognizing events. For instance, subsequent to capturing the aforementioned data, the robot 102 can capture environmental data with sensors, can recognize users, context, and the like, and can use such awareness to selectively capture events. For instance, responsive to recognizing an event (e.g., a party, family dinner, playing a game, watching a move, ... ), the robot 102 can selectively perform a task, such as capturing video, providing additional information, or the like.

Figure 2:
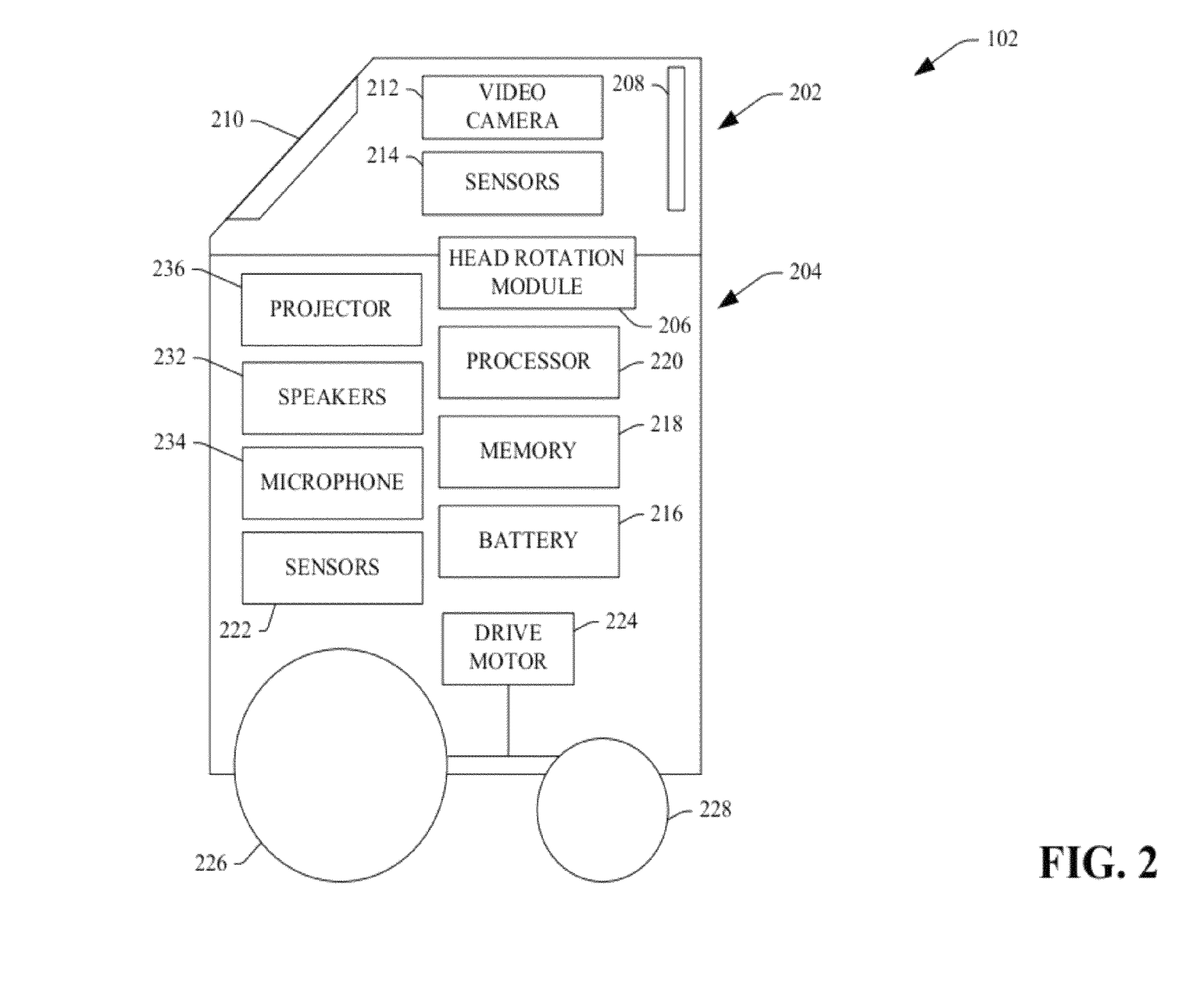
FIG. 2 is a functional block diagram that illustrates exemplary modules of a robot.

Turning now to FIG. 2, an exemplary depiction of contents of the robot 102 is illustrated. The robot 102 comprises a head portion 202 and a body portion 204, wherein the head portion 202 is movable with respect to the body portion 204. The robot 102 can comprise a head rotation module 206 that operates to couple the head portion 202 with the body portion 204, wherein the head rotation module 206 can include one or more motors that can cause the head portion 202 to rotate with respect to the body portion 204. Pursuant to an example, the head rotation module 206 can be utilized to rotate the head portion 202 with respect to the body portion 204 up to 45° in any direction. In another example, the head rotation module 206 can allow the head portion 202 to rotate 90° in relation to the body portion 204. In still yet another example, the head rotation module 206 can facilitate rotation of the head portion 202 180° with respect to the body portion 204. The head rotation module 206 can facilitate rotation of the head portion 202 with respect to the body portion 204 in either angular direction.

The head portion 202 may comprise an antenna 208 that is configured to receive and transmit wireless signals. For instance, the antenna 208 can be configured to receive and transmit Wi-Fi signals, Bluetooth signals, infrared signals, sonar signals, radio frequency (RF) signals, or other suitable signals. In yet another example, the antenna 208 can be configured to receive and transmit data to and from a cellular tower. The robot 102 can send and receive communications with a remotely located computing device through utilization of the antenna 208.

The head portion 202 of the robot 102 can also comprise a display 210 that can be configured to display images or video to a user. In an example, the displayed 210 may be a touch-sensitive display, such that the user of the robot 102 can provide the robot 102 with information by way of selective interaction with the touch sensitive display. Additionally, while not shown, the robot 102 may also comprise a keypad such that a user of the robot 102 can interact with or provide information to the robot 102 through utilization of the keypad.

The head portion 202 of the robot 102 may also comprise a video camera 212 that is configured to capture images of the surroundings of the robot 102. In an example, the video camera 212 can be a high definition video camera that facilitates capturing video that is in, for instance, 720 p format, 720 i format, 1080 p format, 1080 i format, or other suitable high definition video format. Additionally or alternatively, the video camera 212 can be configured to capture relatively low resolution data in a format that is suitable for transmission to a remote computing device by way of the antenna 208.

As the video camera 212 is mounted in the head portion 202 of the robot 102, through utilization of the head rotation module 206, the video camera 212 can be configured to capture live video data of a relatively large portion of an environment of the robot 102. For instance, the video camera 212 can be configured to perform a 360° scan of an environment of the robot as the head portion 202 rotates about the body portion 204 of the robot 102. Further, it is to be understood that the video camera 212 can be configured to capture relatively high resolution still images of an individual for utilization in connection with facial recognition.

The robot 102 may further comprise one or more sensors 214, wherein such sensors 214 may be or include any suitable sensor type that can aid the robot 102 in performing one or more functions, such as autonomous navigation, autonomous docking, or the like. For example, the sensors 214 may comprise a depth sensor, an infrared sensor, a camera, a cliff sensor that is configured to detect a drop off in elevation proximate to the robot 102, a GPS sensor, an accelerometer, a gyroscope, or other suitable sensor type.

The body portion 204 of the robot 102 may comprise a battery 216 that is operable to provide power to other modules in the robot 102. The battery 216 may be, for instance, a rechargeable battery. In such a case, the robot 102 may comprise an interface that allows the robot 102 to be coupled to a power source such that the battery 216 can be relatively easily provided with an electric charge.

The body portion 204 of the robot 102 can also comprise a memory 218 and a corresponding processor 220. As will be described in greater detail below, the memory 218 can comprise a plurality of components that are executable by the processor 220, wherein execution of such components facilitates controlling one or more modules of the robot 102. The processor 220 can be in communication with other modules in the robot 102 by way of any suitable interface such, as for instance, a motherboard. It is to be understood that the processor 220 is the "brains" of the robot 102, and is utilized to process data received from a remote computer, as well as other modules in the robot 102 to cause the robot 102 to perform in a manner desired by a user of such robot 102.

The body portion 204 of the robot 102 can further comprise one or more sensors 222, wherein such sensors 222 can include any suitable sensor that can output data that can be utilized in connection with autonomous or semi-autonomous navigation, detecting a location of a user, or the like. For example, the sensors 222 may be or include sonar sensors, location sensors, infrared sensors, a camera, a cliff sensor, and/or the like. Data that is captured by the sensors 222 and the sensors 214 can be provided to the processor 220, which can process such data and autonomously navigate the robot 102 based at least in part upon data output by the sensors 214 and 222.

The body portion 204 of the robot 102 may further comprise a drive motor 224 that is operable to drive wheels 226 and 228 of the robot 102. For example, the wheel 226 can be a driving wheel, while the wheel 228 can be a steering wheel that can act to pivot to change the orientation of the robot 102. Additionally, each of the wheels 226 and 228 can have a steering mechanism corresponding thereto, such that the wheels 226 and 228 can contribute to the change in orientation of the robot 102. Furthermore, while the drive motor 224 is shown as driving both of the wheels 226 and 228, it is to be understood that the drive motor 224 may drive only one of the wheels 226 or 228 while another drive motor can drive the other of the wheels 226 or 228. Upon receipt of data from the sensors 214 and 222, and or receipt of commands from a user (spoken commands, a gesture etc.), the processor 220 can transmit signals to the head rotation module 206 and/or the drive motor 224 to control orientation of the head portion 202 with respect to the body portion 204 of the robot 102 and/or orientation and position of the robot 102.

The body portion 204 of the robot 102 can further comprise speakers 232 and a microphone 234. Data captured by way of the microphone 234 can be utilized in connection with responding to voice commands of a user. The speakers 232 can be employed to output audio data to one or more users that are proximate to the robot 102. For instance, the speakers 232 can be employed to output instructions to individuals during an initial interaction between the robot 102 and such individuals. The body portion 204 of the robot may also comprise a projector 236 that can project images or video onto a projecting surface, such as a wall of a home. Therefore, the robot 102 can output instructions or request information from a user by way of projections output by the projector 236.

While the robot 102 has been shown in a particular configuration and with particular modules included therein, it is to be understood that the robot can be configured in a variety of different manners, and these configurations are contemplated by the inventors and are intended to fall within the scope of the hereto appended claims. For instance, the head rotation module 206 can be configured with a tilt motor so that the head portion 202 of the robot 102 can not only rotate with respect to the body portion 204, but can also tilt in a vertical direction. Alternatively, the robot 102 may not include two separate portions but may comprise a single unified body, wherein the robot body can be rotated to allow capture of video data by way of the video camera 212. In still yet another exemplary embodiment, the robot 102 can have a unified body structure, but the video camera 212 can have a motor such as a servomotor associated therewith that allows the video camera 212 to alter position to obtain different views of an environment. Still further, modules shown to be in the body portion 204 can be placed in the head portion 202 of the robot 102 and vice versa. It is also to be understood that the robot 102 has been provided solely for the purposes of explanation and is not intended to be limiting as the scope of the hereto appended claims.

Figure 3:
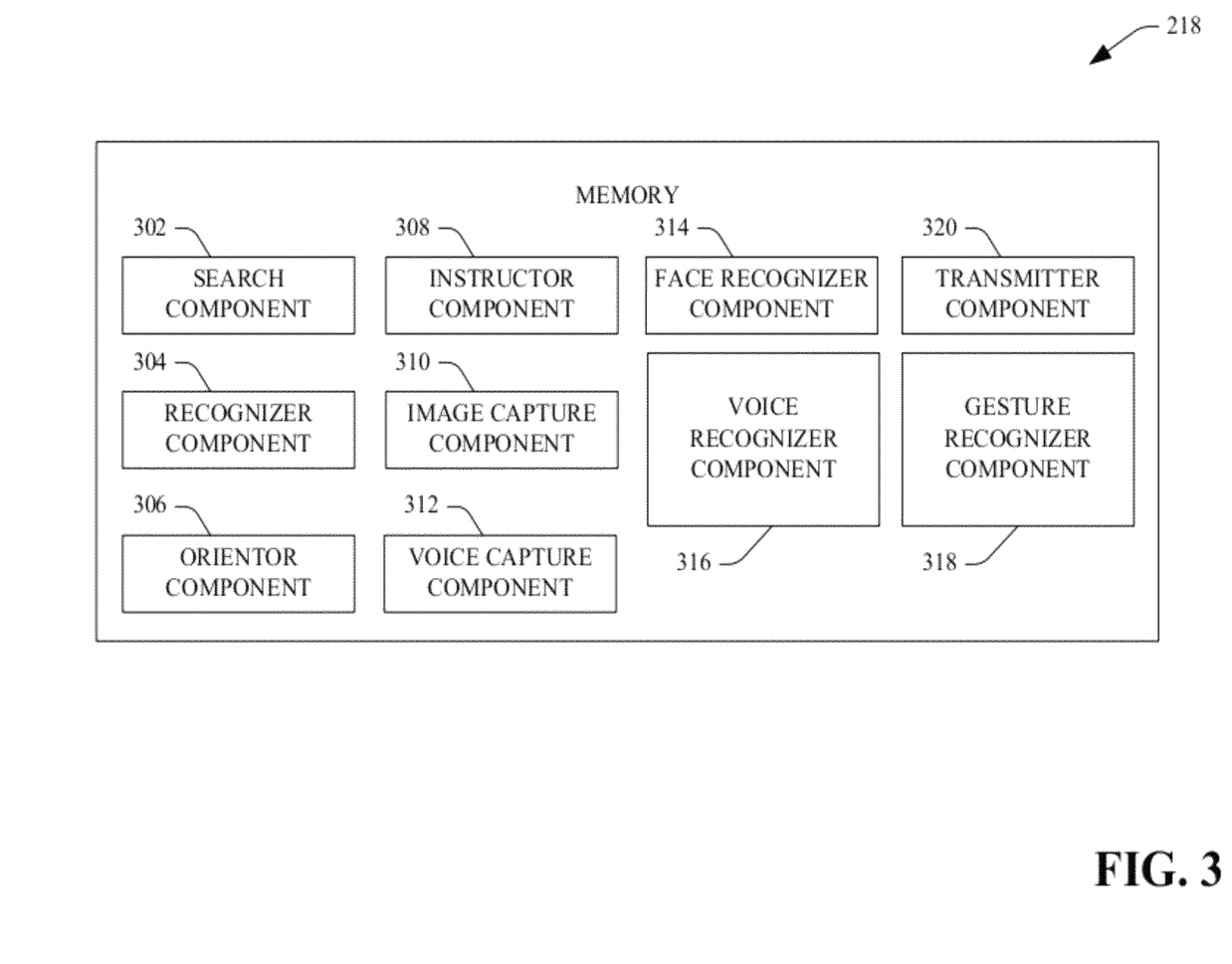
FIG. 3 illustrates a plurality of exemplary components that can be included in memory of the robot.

Referring now to FIG. 3, an exemplary depiction of the memory 218 in the robot 102 is illustrated. While the memory 218 is shown as including a plurality of components, it is to be understood that the memory 218 need not include all of such components. Additionally, certain components may reside in a hard drive of the robot 102 and may be called into the memory 218 as needed. Therefore, not all of the components 218 may reside in the memory 218 at one point in time. Moreover, while the robot 102 is shown as including the memory 218, and the memory 218 is shown as including the plurality of components, it is be understood that the components can be implemented as hardware, such as FPGAs.

The components shown in the memory 218 facilitate interaction with users, particularly with respect to initially meeting users. The memory 218 comprises a search component 302 that can cause a camera on the robot 102 to capture images of surroundings of the robot. For example, the search component 302 can cause the video camera 212 to scan the surroundings of a room, such as performing at 360° scan. The memory 218 or other data storage medium in the robot 102 can receive the images captured by the camera in accordance with commands of the search component 302, and a recognizer component 304 can recognize existence of at least one user in at least one of the captured images. For instance, the search component 302 can cause an infrared camera to capture images of the surroundings of the robot 102, and the recognizer component 304 can recognize a shape of a body of a human and/or a shape of a human head in the infrared images. Additionally or alternatively, the search component 302 can cause an RGB camera to capture images of the surroundings of the robot 102, and the recognizer component 304 can employ image recognition techniques to recognize existence of a human based at least in part upon at least one of the images captured by the camera.

The memory 218 can further comprise and orientor component 306 that can cause a body of the robot 102 to be oriented towards the at least one individual that was recognized in the images by the recognizer component 304. As used herein, the term "orient" when utilized in connection with the orientor component 306 is intended to encompass positioning of an entirety of the robot 102 relative to a user and/or positioning of the head portion 202 relative to the user, such that from the perspective of the user the robot is looking at the user. Thus, the orientor component 306 can be in communication with the drive motor 124 and can cause the robot 102 to be oriented such that, from the perspective of the user, the robot 102 is facing the user.

Subsequent to the robot 102 facing the user, an instructor component 308 can output at least one instruction to the user regarding orientation of the user with respect to the robot 102.

As mentioned above, the instructor component 308 can request that the individual remain still and look directly at the robot 102. Thereafter, the instructor component 308 can cause an instruction to be provided to the user to request that the individual turn 90° to the right, such that the robot 102 can capture a side profile image of the user. The instructor component 308 can output instructions by any of the speakers 232, the projector 236, the display 210, or other suitable mechanism.

An image capture component 310 can cause the camera to capture at least one image of the face of the user subsequent to the instructor component 308 outputting the at least one instruction of the user. The image caused to be captured by the image capture component 310 can be from an RGB camera, an infrared camera, or other suitable camera. The image capture component 310 can cause an image to be captured responsive to user following one or more instructions output by the instructor component 308. For instance, the image capture component 310 can cause a camera to capture images of the face of the user from a plurality of different perspectives.

Additionally, the instructor component 308 can output instructions that request a voice sample from the user. A voice capture component 312 captures the voice sample of the user and retains the voice sample of the user in computer-readable storage. The voice sample, for example, can be a name of the user or some prompted word or phrase.

The memory 218 may additionally comprise a face recognizer component 314. The face recognizer component 314 can recognize the face of the user during subsequent interaction of the user and the robot 102 based at least in part upon the images of the face of the user caused to be captured by the image capture component 310. More particularly, the image capture component 310 can cause the images of the face of the user to be captured during an initial interaction between the user and the robot 102. The face recognizer component 314, during subsequent interactions between the user and the robot 102, can recognize the face of the user based at least in part upon the images initially captured by the image capture component 310.

Then memory 218 can also comprise a voice recognizer component 316 that can recognize the voice of the user based at least in part upon the voice sample captured by the voice capture component 312. Accordingly, even if the camera of the robot 102 is not positioned to capture an image of the user, the robot 102 can recognize the user based upon the voice of the user. Thus, the voice recognizer component 316 can receive an audio signal from the microphone 234 of the robot 102, can compare the audio signal with the captured voice sample and can recognize user based at least in part upon the comparison. The robot 102 may then interact with the user in a manner that is at least somewhat customized to for the user (the robot 102 can display an avatar that is assigned to the user on the display 210). Moreover, in an exemplary embodiment, the voice recognizer component 316 can recognize voice commands set forth by the user. The robot 102 may be configured to respond to a predefined plurality of voice commands, and the voice recognizer component 316 can recognize these commands in spoken words of the user. The robot 102 may then operate based at least in part upon a command recognized by the voice recognizer component 316.

The memory 218 may further comprise a gesture recognizer component 318 that can recognize gestures of the use. In an example, the instructor component 308 can output an instruction to the user, and the individual can respond to such instruction by way of a gesture (a wave of a hand, placing the body in a particular position, or the like). The gesture recognizer component 318 can recognize a gesture as a response to the instruction from the robot 102, and the robot 102 can operate in accordance with the received response.

Still further, the memory 218 may comprise a transmitter component 320 that can transmit images, voice samples, or the like to a cloud computing service by way of the antenna 208. Additionally, the transmitter component 320 can encrypt information that is transmitted from the robot 102 using any suitable encryption scheme, thereby preventing someone listening on the network from obtaining transmitted data.

Figure 4:
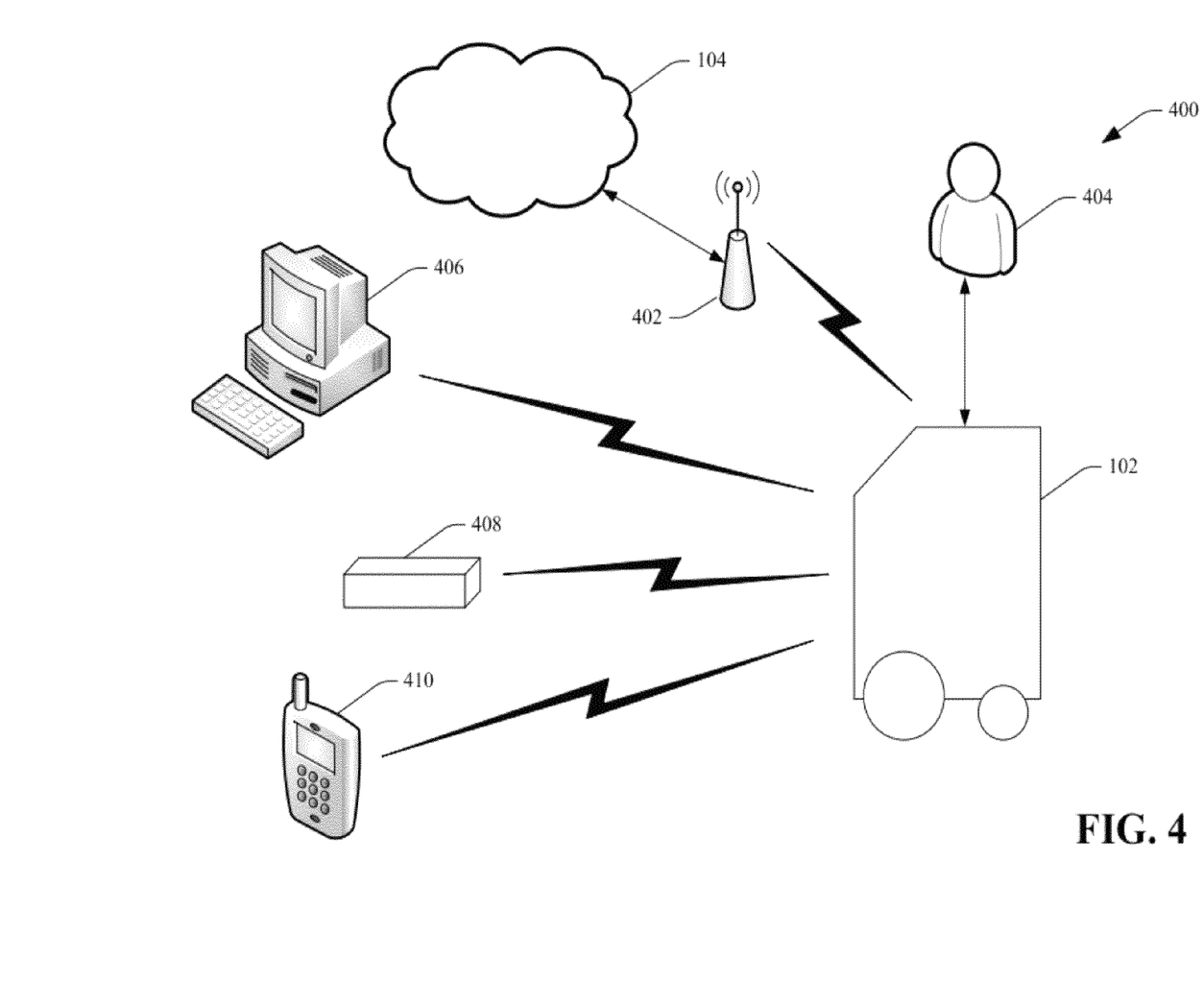
FIG. 4 is a diagram that illustrates various types of communications that can be undertaken between a user and a robot.

Referring now to FIG. 4, an exemplary system 400 that facilitates user interaction with the robot 102 is illustrated. Upon initially being provided with power (after individual opens packaging of the robot and provides power to the robot), the robot 102 can scan for wireless LANs in proximity to the robot 102. The robot 102 can detect a wireless access point 402, which may be a wireless router, for instance. The wireless access point 402 can provide access to the wireless LAN and may further provide access to the cloud services 104.

Upon locating the wireless access point 402, the robot 102 can request that a user 404 select a wireless LAN located by the robot 102 when performing a scan for wireless LANs. For instance, the robot 102 can display a plurality of detected wireless LANs on the display 210 thereof, and the user 404 can see let select the desired wireless LAN. The selection can be made through a touch sensitive display on the robot 102, through voice commands, through gestures, through a keypad on the robot 102, or any other suitable manner for providing input to the robot 102.

The system 400 may include a computing device 406, which may be a personal computer, a laptop computer, a tablet computing device, or other suitable computing device. The computing device 406 can support near field communications such as Bluetooth. The user 404 can communicate a selection of a wireless LAN to the robot 102 by causing the computing device 406 to transmit the selection by way of a near field communications protocol to the robot 102. In another exemplary embodiment, the system 400 may include a remote control 408 that is configured to transmit infrared signals or radio frequency signals to the robot 102 such that the user 404 can select a detected wireless LAN through utilization of the remote control 408. In yet another exemplary embodiment, the system 400 can include a portable telephone 410 such as a smart phone, wherein the portable telephone 410 can support a near field indication protocol. The user 404 can utilize the portable telephone 410 to make a selection of the wireless LAN to which the robot 102 desirably connects.

If the wireless LAN selected by the user 404 requires a password to access such wireless LAN, the robot 102 can request the password from the user 404. For example, the robot 102 can generate graphical indicia on the display 210 of the robot 102 that requests the password. In another embodiment, the robot 102 can output an audio signal that informs the user 404 that a password for the wireless LAN is needed. The user 404 can then provide the password to the robot 102 in a variety of manners. For instance, the user 404 can utilize the touch sensitive display of the robot 102 to enter the wireless password. In another example, the user 404 can depress buttons on a keypad of the robot 102 to provide the password for the wireless LAN to the robot 102. Moreover, since the robot 102 can recognize gestures, the user 404 can make one or more gestures and the robot 102 can interpret these gestures in connection with selecting letters or numbers that may be included in a password for the wireless LAN. Additionally, the robot 102 can include speech recognition functionality such that the user 404 can audibly provide the robot 102 with the password.

In another example, the user 404 can utilize the computing device 406 to provide the password to the robot 102. For instance, the computing device 406 can have knowledge of the password and can communicate the password by way of a near field communications protocol to the robot 102. In yet another example, the computing device 406 may have a speaker thereon and can generate an encoded audio signal that is unable to be interpreted by the human ear, but can be decoded by the robot 102. The decoded password may then be presented to the wireless access point 402 to allow the robot 102 to access the wireless LAN. In still yet another exemplary embodiment, the user 404 can utilize one or more buttons on the remote control 408 to provide the network password to the robot 102. Similarly, the smart phone 410 may have an application executing thereon that allows the smart phone 410 to communicate with the robot 102 and provide the robot 102 with the password for the wireless LAN.

The examples provided above have related to providing the robot 102 with data pertaining to connecting to a wireless LAN. It is be understood, however, that the exemplary manners of communicating with the robot 102 can be utilized in connection with responding to one or more instructions from the robot 102 or requests from the robot 102. For instance, the robot 102 may request information from the user 404 in connection with generating a profile of the user 404. The user 404 can provide information to the robot 102 through gestures, voice, through utilization of the personal computing device 406, through utilization of the remote 408, or through utilization of the mobile telephone 410. In addition to initially interacting with the robot 102 through utilization of gestures, voice, the personal computing device 406, the remote control 408, and/or the portable telephone 410, the user can instruct the robot to perform particular actions by way of any of the after mentioned mediums. For instance, when the user 404 is proximate to the robot 102, the user 404 can utilize voice, gestures, the remote control 408, etc. to cause the robot 102 to perform particular tasks. If the user 404 wishes to cause the robot 102 to operate in a telepresence mode, the user 404 can utilize the computing device 406 or the portable telephone 410 to cause the robot 102 to operate in a remote telepresence session. That is, the user 404 can transmit instructions by way of a network to the robot 102 through utilization of the computing device 406 or the mobile telephone 410, and the robot 102 can operate responsive to receiving such instructions.

Figure 5:
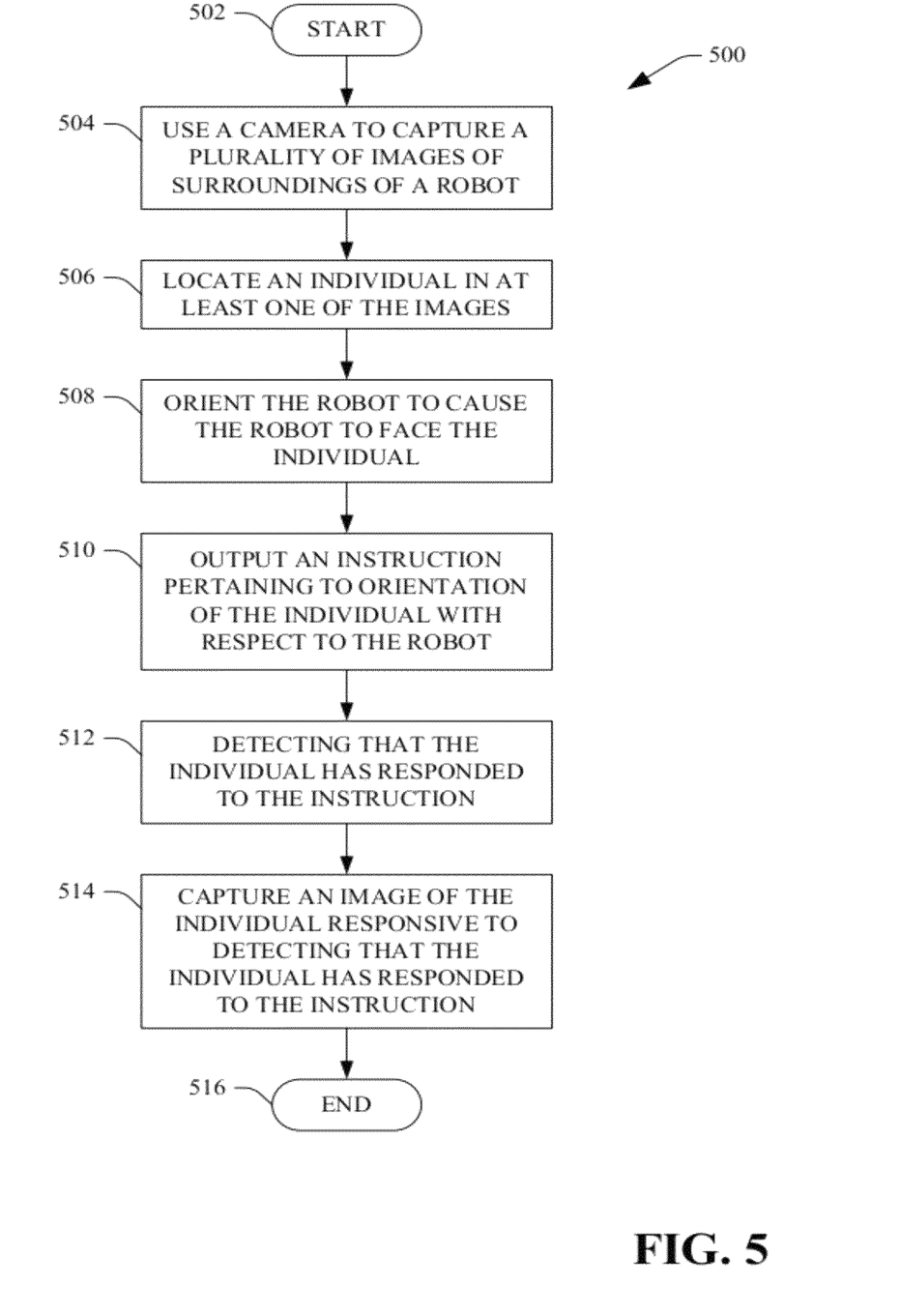
FIG. 5 is a flow diagram that illustrates an exemplary methodology for capturing an image of a face of a user for utilization in connection with facial recognition.
Figure 6:
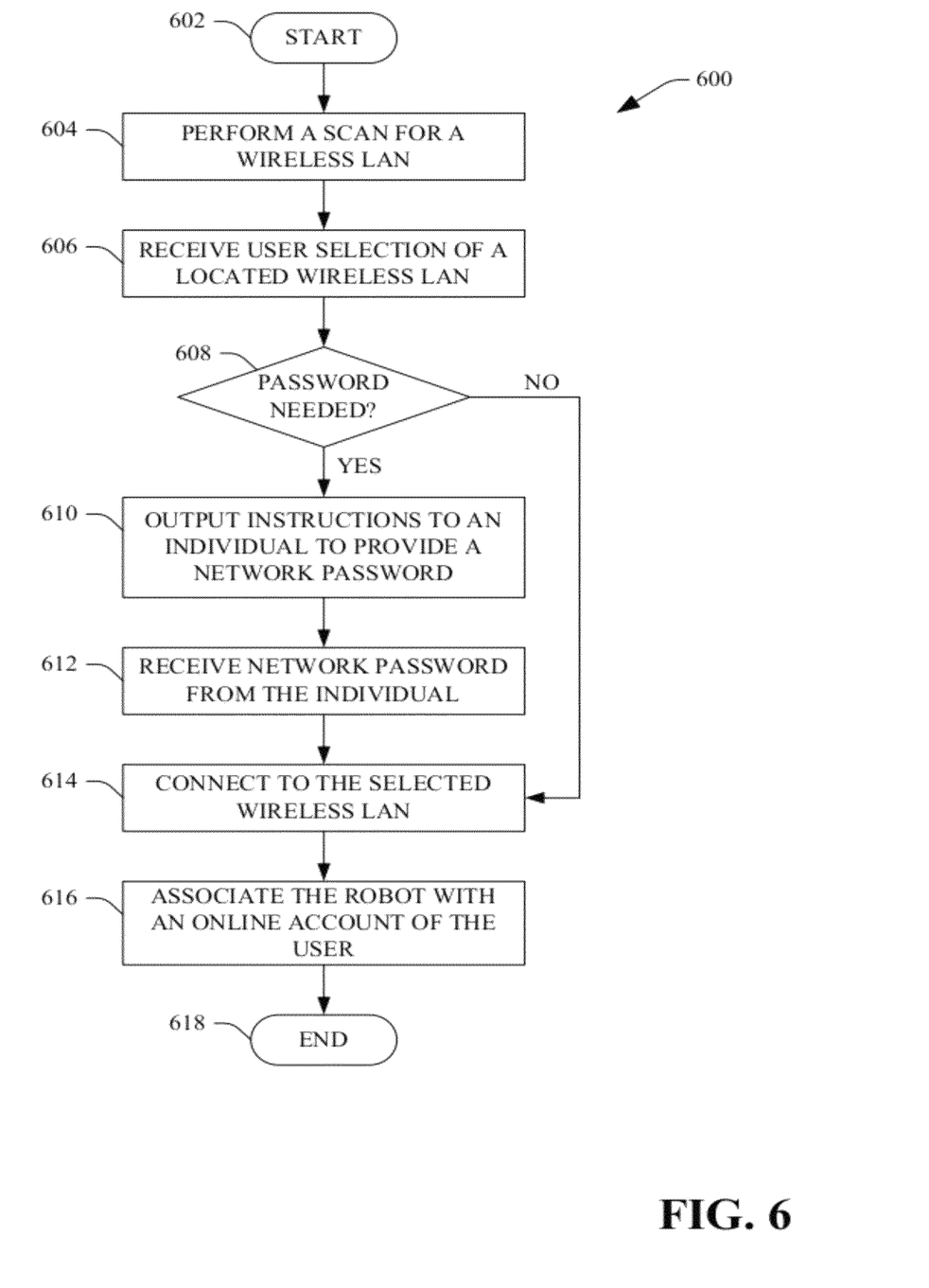
FIG. 6 is a flow diagram that illustrates an exemplary methodology for causing a robot to connect to a wireless local area network.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 5, an exemplary methodology 500 that can be performed by a mobile robot is illustrated. The methodology 500 starts at 502, and at 504 a camera is used to capture a plurality of images of surroundings of the mobile robot. The camera may be an RGB camera, an infrared camera, or some other suitable camera.

At 506, an individual is located in at least one of the captured images at 504. At 508, the mobile robot is oriented to cause the individual located in the at least one of the images to be in a center of a field of view of the camera. In other words, the robot is oriented to face the individual such that from the perspective of the individual the robot is "looking at" such individual.

At 510, an instruction is output of the individual pertaining to orientation of the individual with respect to the robot. For instance, such instruction may be to face the robot, to turn 90° in either direction from the robot, or the like. Instructions output by the mobile robot may be an audible command, a visual instruction displayed on a display screen of the robot, a projected instruction that is projected from a projector on the robot, or other suitable method for providing the individual with an instruction.

A 512, the mobile robot can detect that the individual has responded to the instruction. This detection can be made based upon some audible response from the individual, through a gesture of the individual, through analyzing images of the individual to ascertain that the instruction has been responded to, or the like.

At 514, an image of the individual is captured responsive to the detecting that the individual has responded to the instruction. Subsequently, the mobile robot can interact with the individual and capture a second image of the individual when interacting with such individual. The mobile robot can compare the second image of the individual with the image captured at 514, and can recognize the face of the individual based at least in part upon features extracted from the two captured images. While acts 510 and 512 describe the mobile robot outputting instructions to cause the user to act in a certain manner, as described above, the robot can passively capture images of the user and events pertaining to the user passively. The methodology 500 complete at 516.

With reference now to FIG. 6, an exemplary methodology 600 that can be performed by a mobile robot when interacting with an individual to obtain a connection to a wireless LAN is illustrated. The methodology 600 starts at 602, and at 604 a scan is performed for a wireless LAN. The scan may result in locating a plurality of wireless LANs that are in range of the robot. The plurality of wireless LANs may be displayed to the individual on a display screen of the robot.

At 606, a user selection of an available wireless LAN is received. As described above, this user selection may be received through audible commands from the user, through a gesture of the user, or through interaction of the user with other devices. At 608, a determination is made regarding whether the wireless LAN requires a password to allow the robot to access the wireless LAN. If a password is needed, then 610 instructions are output to the individual to provide a network password. These instructions may be audibly output or output by way of a projector or display on a display screen of the robot. At 612, the network password is received from the individual. The password can be received through spoken words of the individual, through gestures of the individual, through utilization of a remote control, or the like. If at 608 it is detected that no password is needed, or after the password has been received, then at 614 the robot can connect to the selected wireless LAN. At 616, the robot can be associated with an online account of the user. Therefore, data captured by the robot, including images voice samples, and the like can be uploaded by the robot to online storage that is accessible through the online account of the user. The methodology 600 complete at 618.

Figure 7:
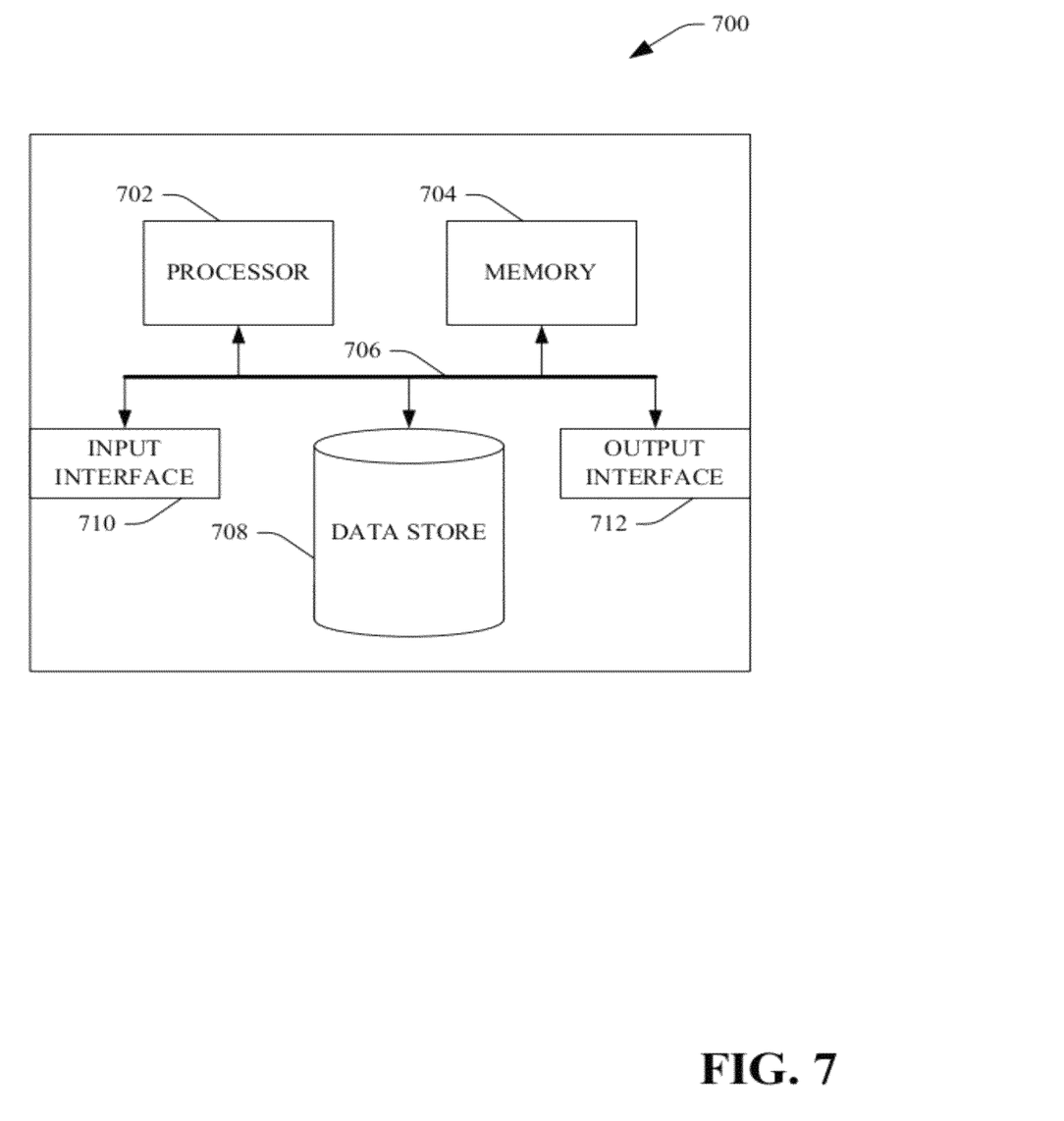
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be included in a mobile robot. In another example, at least a portion of the computing device 700 may be used in a system that communicates with the mobile robot. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store images, voice samples, etc.

The computing device 700 additionally includes a data store 708 that is accessible by the processor 702 by way of the system bus 706. The data store 708 may be or include any suitable computer-readable storage, including a hard disk, memory, etc. The data store 708 may include executable instructions, images, voice samples, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A robot, comprising:
   a processor; and
   memory that comprises instructions that, when executed by the processor, cause the processor to perform acts comprising:
      in response to the robot initially being powered and when used for a first time, searching for available wireless networks;
      based upon input from a user, connecting to a wireless network in the available wireless networks;
      in response to connecting to the wireless network, executing an introduction protocol that is configured to introduce the robot to a user who is in a same room with the robot when the robot is used for the first time, wherein executing the introduction protocol comprises:
  using a camera, scanning surroundings of the robot to capture images of the surroundings of the robot;
  recognizing that an image in the captured images includes the user;
  responsive to recognizing that the image includes the user, orienting a body of the robot such that the robot faces the user;
  using the camera, capturing an image of a face of the user subsequent to the body of the robot being oriented such that the robot faces the user; and
  retaining the image of the face of the user for use in connection with identifying the user during a subsequent interaction of the user with the robot.

2. The robot of claim 1, wherein the memory further comprises instructions that, when executed by the processor, cause the robot to perform acts comprising:
  during a subsequent interaction with the user:
    using the camera to capture another image of the user;
    comparing the another image of the user with the image of the face of the user; and
    identifying the user based at upon the comparing of the another image of the user with the image of the face of the user.

3. The robot of claim 1, wherein executing the introduction protocol further comprises transmitting the image of the face of the user to a cloud-based data store, the image of the face retained in the data store as a portion of a profile of the user.

4. The robot of claim 1, wherein scanning the surroundings comprises performing a 360 degree scan of the surroundings, and wherein recognizing that the image in the captured images includes the user is performed subsequent to the 360 degree scan of the surroundings being performed.

5. The robot of claim 1, wherein scanning the surroundings comprises capturing images of the surroundings until it is recognized that the image in the captured images includes the user, and wherein scanning of the surroundings continues subsequent to the image of the face of the user being captured.

6. The robot of claim 1, wherein executing the introduction protocol further comprises:
  subsequent to orienting the body of the robot such that the robot faces the user, instructing the user to provide a voice sample to the robot;
  capturing the voice sample from the user; and
  retaining the voice sample of the user in computer-readable storage for use in connection with identifying the user during the subsequent interaction of the user with the robot.

7. The robot of claim 6, wherein the memory further comprises instructions that, when executed by the robot, cause the robot to perform acts comprising:
  during a subsequent interaction with the user:
    capturing an audio signal through use of a microphone;
    comparing the audio signal with the captured voice sample; and
    recognizing the user based upon the comparing of the audio signal with the captured voice signal.

8. The robot of claim 1, wherein executing the introduction protocol further comprises outputting a request to the user for information pertaining to the user.

9. The robot of claim 8, wherein executing the introduction protocol further comprises recognizing a voice command from the user as a response to the request.

10. The robot of claim 8, further comprising a keypad that receives a response to the request from the user.

11. The robot of claim 8, further comprising an antenna that receives a response to the request from a portable computing device.

12. The robot of claim 8, wherein executing the introduction protocol further comprises recognizing a gesture of the user as a response to the request.

13. The robot of claim 1, wherein the camera is an infrared camera.

14. A method performed by a mobile robot, comprising:
  immediately subsequent to an initial powering of the robot and when the robot is being used for a first time:
    connecting to a wireless local area network (LAN);
    responsive to connecting to the wireless LAN, executing an introduction protocol,
    the introduction protocol configured to introduce the robot to a user who will subsequently interact with the robot, wherein executing the introduction protocol comprises:
      using a camera to capture a plurality of images of surroundings of the robot;
      identifying existence of the user in an image in the plurality of images without determining an identity of the user;
      responsive to identifying existence of the user in the image, orienting the robot to cause the user to be in a center of a field of view of the camera;
      outputting an instruction to the user pertaining to orientation of the user with respect to the robot;
      detecting that the user has responded to the instruction;
      capturing another image of the user responsive to detecting that the user has responded to the instruction; and
      retaining the another image of the user for use in connection with identifying the user during subsequent interactions between the robot and the user.

15. The method of claim 14, wherein the instruction comprises an audible command output by the robot.

16. The method of claim 14, wherein the instruction comprises a visual instruction displayed on a display of the robot.

17. The method of claim 14, wherein the instruction comprises a projected instruction that is projected from a projector on the robot.

18. The method of claim 14, further comprising:
  subsequent to executing the introduction protocol:
    during a subsequent interaction between the robot and the user, capturing a second image of the user; and
    identifying the user based upon a comparison between the another image and the second image.

19. The method of claim 14, further comprising:
  subsequent to executing the introduction protocol:
    capturing data by way of a sensor on the robot;
    recognizing an event based upon the another image of the user and the captured data; and
    initiating an action responsive to recognizing the event.

20. A robot that comprises a computer-readable medium, the computer-readable medium comprising instructions that, when executed by a processor of the robot, causes the processor of the robot to perform acts comprising:
  responsive to the robot being initially powered and during a first use of the robot, performing a scan for available wireless networks;
  responsive to receiving a password for a wireless network in the wireless networks, connecting to the wireless network;
  responsive to connecting to the wireless network, executing an introduction protocol, the introduction protocol configured to introduce the robot to a user who will have subsequent interactions with the robot, wherein executing the introduction protocol comprises:

performing a 360 degree video scan of surroundings of the robot;

recognizing that the user is included in an image captured during the video scan without identifying the user;

rotating a body of the robot to face the user responsive to recognizing that the user is included in the image;

outputting an instruction to the user pertaining to orientation of the user with respect to the robot;

detecting that the user has followed the instruction;

responsive to detecting that the user has followed the instruction, capturing another image of the user;

extracting features from the another image that are indicative of an identity of the user; and retaining the features extracted from the another image to facilitate identifying the user during subsequent interaction between the robot and the individual.

* * * * *